(12) United States Patent
Larson et al.

(10) Patent No.: US 9,447,504 B1
(45) Date of Patent: Sep. 20, 2016

(54) METHOD OF ETCHING USING INKJET PRINTING

(71) Applicant: XEROX CORPORATION, Norwalk, CT (US)

(72) Inventors: James R. Larson, Fairport, NY (US); Jeffrey J. Folkins, Rochester, NY (US); Chu-Heng Liu, Penfield, NY (US); Wayne A. Buchar, Bloomfield, NY (US); Mandakini Kanungo, Penfield, NY (US); Santokh Badesha, Pittsford, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/867,730

(22) Filed: Sep. 28, 2015

(51) Int. Cl.
*H01B 13/00* (2006.01)
*C23F 1/14* (2006.01)
*B41J 2/01* (2006.01)

(52) U.S. Cl.
CPC ... *C23F 1/14* (2013.01); *B41J 2/01* (2013.01)

(58) Field of Classification Search
CPC .................................. C23F 1/14; B41J 2/01
USPC ...................................................... 216/13, 83
See application file for complete search history.

(56) References Cited

U.S. PATENT DOCUMENTS

| 2009/0104384 A1* | 4/2009 | Nakao ................. H01G 4/0085 428/32.18 |
| 2010/0085319 A1 | 4/2010 | Hayashi et al. |
| 2013/0105206 A1 | 5/2013 | Kim et al. |

FOREIGN PATENT DOCUMENTS

WO    2012070016 A1    5/2012

\* cited by examiner

*Primary Examiner* — Roberts Culbert
(74) *Attorney, Agent, or Firm* — MH2 Technology Law Group LLP

(57) ABSTRACT

A process of patterning a conductive film. The process comprises providing a substrate comprising a conductive film positioned on a surface of the substrate. A hydrophilic primer layer is coated on the conductive film. Droplets of etchant are ejected from an inkjet printer in an imagewise pattern onto the primer layer to pattern the conductive film. The primer layer is removed from the substrate.

20 Claims, 1 Drawing Sheet

METHOD OF ETCHING USING INKJET PRINTING

DETAILED DESCRIPTION

1. Field of the Disclosure

This disclosure relates generally to method of etching using inkjet printers.

2. Background

Organic conductive films such as poly(3,4-ethylenedioxythiophene) ("PEDOT") (organic conductor) can be rendered non-conductive by treatment with an etchant, such as sodium hypochlorite solution. A known process for patterning an organic conductive film includes forming a mask on the conductive film, followed by dipping the masked conductive film in an etchant bath in which the exposed areas of the organic conductor are converted to non-conductive regions, thereby forming a desired pattern of conductive regions separated by non-conductive regions.

Employing inkjet printing techniques for selective deposition of a mask layer is also well known in the art. For example, selective deposition of ink deposited by inkjet printing techniques has been used to form etching masks. However, the use of etch masks generally involves removal of the mask. Mask patterning and removal further complicates the etching process and can be time consuming and/or expensive.

Techniques for selectively providing an etching solution directly to a film to be etched in order to achieve an imagewise etch is also known in the art. Such techniques allow the omission of the etch mask from the process. However, concerns with such processes include that desired image quality may not be realized.

Techniques for providing improved image quality for processes involving the selective deposition of etchants by inkjet printers would be a welcome step forward in the art.

SUMMARY

An embodiment of the present disclosure is directed to a process of patterning a conductive film. The process comprises providing a substrate comprising a conductive film positioned on a surface of the substrate. A hydrophilic primer layer is coated on the conductive film. Droplets of etchant are ejected from an inkjet printer in an imagewise pattern onto the primer layer to pattern the conductive film. The primer layer is removed from the substrate.

The sacrificial coating compositions of the present disclosure can provide one or more of the following advantages: a process that allows aqueous phase etchant to wet a conductive layer surface; a process that allows etching of a conductive layer without a mask; a process that employs a sacrificial hydrophilic primer layer to provide improved etch pattern quality compared to the same process without the sacrificial hydrophilic primer layer.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrate embodiments of the present teachings and together with the description, serve to explain the principles of the present teachings.

Figure 1A:
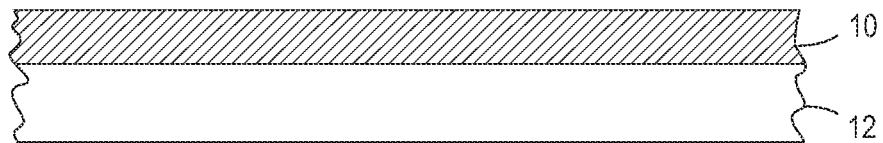
FIGS. 1A to 1C illustrate a process of patterning a conductive film, according to an embodiment of the present disclosure.

It should be noted that some details of the FIGURE have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. In the drawings, like reference numerals have been used throughout to designate identical elements. In the following description, reference is made to the accompanying drawings that form a part thereof, and in which is shown by way of illustration a specific exemplary embodiment in which the present teachings may be practiced. The following description is, therefore, merely exemplary.

As used herein, the term "hydrophilic" refers to any composition or compound that attracts water molecules. As used herein, a reference to a hydrophilic composition refers to a liquid carrier that carries a hydrophilic agent. Examples of liquid carriers include, but are not limited to, a liquid, such as water or alcohol, that carries a dispersion, suspension, or solution.

As used herein, a reference to a dried layer or dried coating refers to an arrangement of a hydrophilic compound after all or a substantial portion of the liquid carrier has been removed from the composition through a drying process. As described in more detail below, an indirect inkjet printer forms a layer of a hydrophilic composition on a surface of an intermediate transfer member using a liquid carrier, such as water, to apply a layer of the hydrophilic composition. The liquid carrier is used as a mechanism to convey the hydrophilic composition to an image receiving surface to form a uniform layer of the hydrophilic composition on the image receiving surface.

Figure 1B:
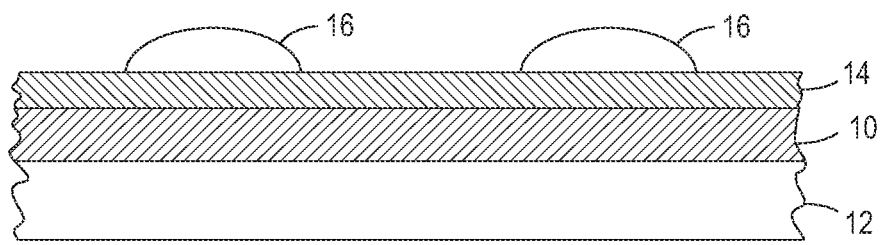
Figure 1C:
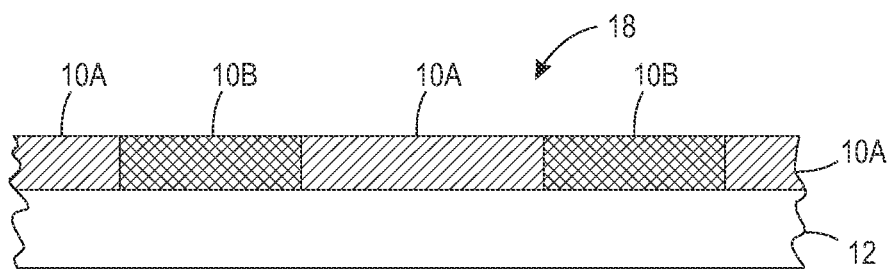

Referring to FIGS. 1A to 1C, an embodiment of the present disclosure is directed to a process of patterning a conductive film 10. The process comprises providing a substrate 12 having the conductive film 10 positioned thereon. A hydrophilic primer layer 14 is coated on the conductive film 10. Droplets of etchant 16 are ejected from an inkjet printer (not shown) in an imagewise pattern onto the primer layer 14. The droplets can diffuse or otherwise soak through the primer layer 14 to form a pattern 18 in the conductive film 10. The primer layer 14 is then removed from the substrate 12 leaving the patterned conductive film 10A. In some embodiments, as discussed in more detail below, a patterned electrically insulating film 10B can also remain on the substrate 12.

The conductive film 10 can comprise any suitable conductive material. In an embodiment, the conductive film is an organic film. As an example, suitable organic materials can be selected from the group consisting of polyacetylene, polyphenylene vinylene; polypyrrole, polythiophene, polyaniline, polyphenylene sulfide, polyphenylene, polyfluorene, polybithiophene, polyisothiophene, poly(3,4-ethylenedioxythiophene), polyisothianaphthene, polyisonaphthothiophene, polydiacetylene, poly(paraphenylene vinylene), polyacene, polythiazyl, poly(ethylene vinylene), polyparaphenylene, polydodecylthiophene, poly(phenylene vinylene), poly(thienylene vinylene), polyphenylenesulfide, or conductive derivatives of such films. In an embodiment, polythiophenes, such as polythiophene, polybithiophene, polyisothiophene, poly(3,4-ethylenedioxythiophene), polyisonaphthothiophene, polydodecylthiophene, poly(3,4-ethylenedioxythiophene) (PEDOT) or poly(3,4-ethylenedioxythiophene) polystyrene sulfonate (PEDOT-PSS) are employed. The organic conductor films can be doped or undoped to provide increased conductivity. Suitable dopants are known in the art, such as those disclosed in U.S. Patent Application Publication No. 2012/0273454, the disclosure of which is hereby incorporated by reference in its entirety.

Any other type of conductive films that can be etched can also be employed. In an embodiment, the conductive film 10 is selected from the group consisting of: metals, such as copper, aluminum, titanium, tungsten and so forth; and conductive non-metals (e.g., a compound of a metal and a non-metal element), such as conductive metal oxides, an example of which is indium tin oxide, metal nitrides and metal silicides, such as aluminum silicide, copper silicide, titanium silicide and so forth. In an embodiment, the conductive film 10 is hydrophobic.

In an embodiment, coating the primer layer 14 can include depositing a wet sacrificial coating composition onto the substrate 12. After deposition, the wet coating composition is dried to form the primer layer 14. The wet sacrificial coating composition can be any composition that, when dried to form the layer 14, will allow aqueous phase etchant to wet the surface of primer layer 14 so as to aid in maintaining the etching pattern. For example, the primer layer 14 may aid in trapping the etching solution in place on the surface in a desired etch pattern.

The wet sacrificial coating composition can be made, for example, by mixing ingredients comprising: a waxy starch, at least one hygroscopic material, at least one surfactant; and a liquid carrier. In an alternative embodiment, the wet sacrificial coating includes a waxy starch, hygroscopic material and a liquid carrier, but not the surfactant. In yet another embodiment, the wet sacrificial coating includes a waxy starch and a liquid carrier, but not the hygroscopic material or surfactant. In another embodiment, the wet sacrificial coating includes a waxy starch, surfactant and a liquid carrier, but not the hygroscopic material.

In an embodiment, the waxy starch employed in the sacrificial coating compositions of the present disclosure can be a waxy maize starch. For example, the waxy maize starch can be a cationic waxy maize starch or a non-cationic waxy maize starch. Examples of cationic starch include acid treated waxy maize starch, as described for example, in U.S. patent application Ser. No. 14/219,125, filed Mar. 19, 2014, in the name of Guiqin Song et al., and entitled "WETTING ENHANCEMENT COATING ON INTERMEDIATE TRANSFER MEMBER (ITM) FOR AQUEOUS INKJET INTERMEDIATE TRANSFER ARCHITECTURE," the disclosure of which is incorporated herein by reference in its entirety. Suitable non-cationic waxy maize starches include acid depolymerized waxy starch, available from Cargill, Inc. as CALIBER® 180. The waxy starch may also be any other kind of waxy starch other than a waxy maize starch, such as a waxy rice starch, a waxy cassava starch, a waxy potato starch, a waxy wheat starch and a waxy barley starch. The viscosity of the at least one waxy starch, such as waxy maize starch, at about 25° C. may be less than about 1000 cps at a starch solid content of about 4%, such as less than about 700 cps, or less than 500 cps.

In certain embodiments disclosed herein, the at least one waxy starch may be gelatinized. Starch gelatinization is a process that breaks down the intermolecular bonds of starch molecules in the presence of water and heat, allowing the hydrogen bonding sites (the hydroxyl hydrogen and oxygen) to engage more water. Therefore heating the at least one waxy starch in the presence of water irreversibly dissolves the starch granule. For example, a waxy starch slurry can be prepared by mixing deionized water with a desired amount of starch, such as a solid starch content of from about 1 weight percent to about 30 weight percent, based on the total weight of the slurry. The starch slurry is gelatinized, or cooked out, either in a batch process or by a jet cooker. For batch processing, the starch slurry can be heated to a temperature of, for example, from about 93° C. to about 98° C., and kept at this temperature for about 15 minutes to about 60 minutes.

The waxy starch can be used in any suitable amount. In an embodiment, the weight percent of the starch in the wet sacrificial coating of the present disclosure ranges from about 0.5 weight percent to about 10 weight percent, such as about 1 to about 8, or about 2 to about 6 weight percent, based on the total weight of the wet sacrificial coating composition.

Polyvinyl alcohol (PVOH) and copolymers thereof are optionally included with the starch as part of the binder in the sacrificial coating compositions of the present disclosure. In an embodiment, the waxy starch and the at least one PVOH and/or PVOH co-polymer are respectively in a weight ratio ranging from about 2:1 to about 20:1, such as about 3:1 to about 16:1, or about 4:1.

The PVOH and copolymers thereof can be selected from the group consisting of i) polyvinyl alcohol and ii) a copolymer of vinyl alcohol and alkene monomers. In an embodiment, the at least one polymer is polyvinyl alcohol. In an embodiment, the at least one polymer is a copolymer of polyvinyl alcohol and alkene monomers. Examples of suitable polyvinyl alcohol copolymers include poly(vinyl alcohol-co-ethylene). In an embodiment, the poly(vinyl alcohol-co-ethylene) has an ethylene content ranging from about 5 mole % to about 30 mole %. Other examples of polyvinyl copolymer include poly(acrylic acid)-poly(vinyl alcohol) copolymer, polyvinyl alcohol-acrylic acid-methyl methacrylate copolymer and poly(vinyl alcohol-co-aspartic acid) copolymer. One example of a commercially available PVOH is SELVOL™ PVOH 825, available from Sekisui Specialty Chemicals of Dallas, Tex.

It is well known that PVOH can be manufactured by hydrolysis of polyvinyl acetate from, for example, partially hydrolyzed (87-89%), intermediate hydrolyzed (91-95%), fully hydrolyzed (98-98.8%) to super hydrolyzed (more than 99.3%). In an embodiment, the polyvinyl alcohol employed in the compositions of the present disclosure has a hydrolysis degree of at least 95% or higher, or at least 98% or 99.3% or higher.

The polyvinyl alcohol or copolymer thereof can have any suitable molecular weight. In an embodiment, the weight average molecular weight ranges from about 85,000 to about 186,000, such as from about 90,000 to about 180,000, or from about 100,000 to about 170,000, or from about 120,000 to about 150,000. Employing relatively high molecular weight PVOH can generate a strong thin film when combined with the starch. The loading of the PVOH is not higher than 50%, since higher loading of high molecular weight PVOH can significantly increase the viscosity and result in coating problems.

In an embodiment, the polyvinyl alcohol can have a suitable viscosity for forming the primer layer 14. For example, at about 4% by weight of the polyvinyl alcohol in a solution of deionized water, and at a temperature of 20° C., the viscosity can be at least 20 centipoises ("cps"), such as 25, 26 or 30 cps or higher, where the % by weight of polyvinyl alcohol is relative to the total weight of polyvinyl alcohol and water.

Polyvinyl alcohol is a hydrophilic polymer and has good water retention properties. As a hydrophilic polymer, the coating film formed from polyvinyl alcohol can also exhibit good water retention properties, which can assist the etchant in spreading on the primer layer 14. Because of its superior strength, coatings formulated with polyvinyl alcohol may achieve a significant reduction in total solid loading level. This may provide substantial cost savings while providing a significant improvement of the coating film performance. Polyvinyl alcohol and starch based sacrificial coating compositions may have improved mechanical properties and provide improved printer run-ability compared to other known sacrificial coating compositions. Moreover, both polyvinyl alcohol and starch are considered environmentally friendly.

The chemical structure of the starch and optional polyvinyl alcohol containing coating can be tailored to fine-tune the wettability and release characteristics of the primer layer 14. This can be accomplished by employing one or more hygroscopic materials and one or more surfactants in the coating composition.

Any suitable hygroscopic material can be employed in the sacrificial coating compositions of the present disclosure. Hygroscopic materials can include substances capable of absorbing water from their surroundings, such as humectants. In an embodiment, the hygroscopic material can be a compound that is also functionalized as a plasticizer. In an embodiment, the at least one hygroscopic material is selected from the group consisting of glycerol, sorbitol or glycols such as polyethylene glycol, and mixtures thereof. A single hygroscopic material can be used. Alternatively, multiple hygroscopic materials, such as two, three or more hygroscopic materials, can be used.

Any suitable surfactants can be employed. Examples of suitable surfactants include anionic surfactants, cationic surfactants, non-ionic surfactants and mixtures thereof (e.g., an anionic surfactant and a non-ionic surfactant). The non-ionic surfactants can have an HLB value ranging from about 4 to about 14. A single surfactant can be used. Alternatively, multiple surfactants, such as two, three or more surfactants, can be used. For example, the mixture of a low HLB non-ionic surfactant with a value from about 4 to about 8 and a high HLB non-ionic surfactant with value from about 10 to about 14 demonstrates good wetting performance. In an embodiment, the at least one surfactant is sodium lauryl sulfate.

The wet compositions of the present disclosure include a liquid carrier. The liquid carrier can be an aqueous based carrier, such as a carrier comprising at least 50% by weight water, such as 90% or 95% by weight or more water, such as 100%. Other ingredients that can be included as part of the aqueous based carrier system include organic solvents, such as ketones. An example of a ketone solvent is 2-Pyrrolidinone, which can potentially replace some loading of the glycerol. Other organic solvents that can be used in addition to or in place of 2-Pyrrolidinone include terpineol; dimethylsulfoxide; N-methylpyrrolidone; 1,3-dimethyl-2-imidazolidinone; 1,3-dimethyl-3,4,5,6-tetrahydro-2 pyrimidinone; dimethylpropylene urea; isopropanol, MEK (methyl ethyl ketone) and mixtures thereof. The organic solvents can have benefits, such as to improve film forming property, control drying characteristics and control wetting property of the semi-dry sacrificial layer. In an embodiment, the aqueous based carrier is 100% water.

In addition to the ingredients discussed above, the mixture can include other ingredients, such as biocides. Example biocides include ACTICIDES® CT, ACTICIDES® LA 1209 and ACTICIDES® MBS in any suitable concentration, such as from about 0.1 weight percent to about 2 weight percent.

The ingredients of the primer layer 14 can be mixed in any suitable manner to form a composition that can be coated onto the conductive layer 10. The ingredients can be mixed in any suitable amounts. For example, the waxy starch can be added in an amount of from about 0.5 to about 10 weight percent, or from about 2 to about 8, or from about 5 to about 7 weight percent based upon the total weight of the coating mixture. The optional polyvinyl alcohol or vinyl alcohol copolymer can be added in an amount of from about 0 to about 5% by weight, or from about 0.5 to about 4% by weight, or from about 1 to about 3% by weight, based upon the total weight of the coating mixture. The surfactants can be present in an amount of from about 0.01 to about 4% by weight, or from about 0.05 to about 2% by weight, or from about 0.08 to about 1% by weight, based upon the total weight of the coating mixture. The hygroscopic material can be present in an amount of from about 0.5 to about 30% by weight, or from about 2 to about 25 by weight, or from about 4 to about 20% by weight, or about 10 to about 15% by weight, based upon the total weight of the coating mixture.

The wet coating compositions of the present disclosure can include any other suitable ingredients in any desired amounts. Alternatively, ingredients not expressly recited in the present disclosure can be limited and/or excluded from the wet coating compositions disclosed herein. Thus, the amounts of the waxy starch, liquid solvent (e.g., water or other solvents) and the amounts of any of the optional ingredients expressly recited herein that are included as part of the wet coating composition, such as the polyvinyl alcohol or vinyl alcohol copolymers, surfactants, hygroscopic material and/or biocide, can add up to 90% to 100% by weight of the total ingredients employed in the wet compositions of the present disclosure, such as 95% to 100% by weight, or 98% to 100% by weight, or 99% to 100% by weight, or 100% by weight of the total ingredients.

The sacrificial coating compositions of the present disclosure can be used to form primer layer 14 over any suitable substrate having a conductive film 10 positioned thereon. Initially, the sacrificial coating composition is applied to conductive film 10, where it is semi-dried or dried to form primer layer 14. The layer 14 can have a higher surface energy and/or be more hydrophilic than the conductive film 10, which is usually a material with low surface free energy (e.g., a hydrophobic film).

Any suitable coating method can be employed to apply the sacrificial coating composition to the conductive film 10, including, but not limited to, roll coating, dip coating, spray coating, spin coating, flow coating, stamp printing, die extrusion coatings, flexo and gravure coating and/or blade techniques. In embodiments, the liquid sacrificial coating composition can be coated on conductive film 10 by use of an anilox roller. In an embodiment, the liquid sacrificial coating composition can be coated on conductive film 10 by using an air atomization device, such as an air brush or an automated air/liquid sprayer, which can be used for spray coating. In another example, a programmable dispenser can be used to apply the coating material to conduct a flow coating. Use of anilox rollers, air atomization devices and programmable dispensers for coating are well known in the art.

The drying or curing process of the sacrificial coating composition can include heating to an appropriate temperature, depending on the material or process used. For example, the wet coating can be heated to a temperature ranging from about 30° C. to about 200° C. for about 0.01 to about 100 seconds or from about 0.1 second to about 60 seconds. Also, the speed of air flow can be adjusted during the drying process to accelerate drying at low temperature. In embodiments, after the drying and curing process, the primer layer 14 can have a thickness ranging from about 0.02 micrometer to about 10 micrometers, or from about 0.02 micrometer to about 5 micrometers, or from about 0.05 micrometer to about 1 micrometer. In an embodiment, the primer layer 14 can cover all or a portion of a major surface of the conductive film 10.

Other suitable hydrophilic primer materials can be used in place of or in addition to the starch based primers discussed above. Examples of alternative hydrophilic primer materials include surfactant based hydrophilic sol-gel coatings, such as are described in the book, Sol-Gel Technologies For Glass Producers and Users, edited by Michel Aegerter, et al., Springer Science, 2004, pp. 187-194, the disclosure of which is hereby incorporated by reference in its entirety. Still other hydrophilic materials can be employed, as would be understood by one of ordinary skill in the art given the present disclosure.

After the hydrophilic primer layer 14 is coated on the conductive film 10, an etchant 16 is ejected in an imagewise pattern onto the primer layer 14 to etch the conductive film 10. The term "etch" or "etching" is defined broadly herein to include removal of material to form a desired pattern, as well as the chemical conversion of regions of a conductive material to form a less-conductive pattern effective for electrically insulating remaining conductive regions of the conductive material so as to form a conductive pattern, which chemical conversion may or may not involve removal of material from the conductive surface. The term etchant is defined herein to be a chemical composition capable of etching, as the term etching is defined herein.

Thus, in an embodiment, the etchant converts portions of the conductive film 10 to a significantly less electrically conductive pattern 10B, such as by oxidation or nitridation. The less conductive pattern comprises a different material than conductive film 10, such as an oxidized or nitrided compound of the conductive material, which is significantly less conductive than the conductive film. For example, the less conductive film can be electrically insulating. The less conductive pattern 10B can extend sufficiently through the thickness of conductive film 10 so as to provide a desired degree of electrical insulation between conductive regions 10A. For example, the less conductive pattern 10B can extend through the entire thickness of conductive film 10.

Any suitable etchant for converting the conductive film 10 to a less conductive material can be employed. For example, where the conductive film 10 is an organic conductor such as PEDOT or PEDOT-PSS, or any of the other organic conductive films described herein, suitable etchants can include one or more oxidizing agents selected from the group consisting of an aqueous sodium hypochlorite solution and a hydrogen peroxide solution.

In an alternative embodiment, the etchant removes portions 10B of the conductive film 10 to form a conductive pattern 10A. Any suitable etchant can be employed for this process. The type of etchant used may depend on a variety of factors, such as the type of material to be removed. As an example, the etchants can comprise at least one acid selected from the group consisting of hydrochloric acid (HCl), hydrogen bromide (HBr), hydrogen Iodide (HI), sulfuric acid ($H_2SO_4$), nitric acid ($HNO_3$), hydrofluoric acid (HF) and phosphoric acid ($H_3PO_4$), among others. Any other suitable etchant can be employed to remove selective areas of the conductive layer to form the desired conductive pattern. A variety of examples of etchants are well known in the art, such as those described in U.S. Pat. Nos. 5,593,601 and 6,534,416, the disclosures of which are hereby incorporated by reference in their entireties.

EXAMPLES

Example 1

Etching Using Sacrificial Primer Layer

A wet primer layer was deposited on a PEDOT conductive film and allowed to dry. The primer layer was made from an aqueous solution of waxy starch and glycerol. A drop of sodium hypochlorite etchant was deposited on the dried primer layer and allowed to sit for a period of time. It was observed that the primer layer accepted the drop of etching solution without the problem of beading of the etching solution. The primer layer was then easily removed by washing with water and the PEDOT film was examined. It was found that the etching solution was effective in causing the PEDOT film to become non-conductive in the area in which the etchant had been applied.

Example 2

Etching without Sacrificial Primer Layer

The same etching solution was deposited onto a PEDOT conductive film without a primer layer. It was observed that the etching solution exhibited beading on the PEDOT conductive film. This beading of the etchant may be due, in part, to the surface characteristics of the conductive film onto which the etchant was deposited, and potentially may result the etchant not suitably wetting the surface so as to maintain the desired pattern during etching.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A process of patterning a conductive film, the process comprising:
    providing a substrate comprising a conductive film positioned on a surface of the substrate;
    coating a hydrophilic primer layer on the conductive film;
    ejecting droplets of etchant from an inkjet printer in an imagewise pattern onto the primer layer to pattern the conductive film; and
    removing the primer layer from the substrate.

2. The process of claim 1, wherein the conductive film is hydrophobic.

3. The process of claim 1, wherein the conductive film is an organic film.

4. The process of claim 3, wherein the organic film is selected from the group consisting of polyacetylene, polyphenylene vinylene; polypyrrole, polythiophenes, polyaniline, polyphenylene sulfide, polyphenylene, polyfluorene, polyisothianaphthene, polyisonaphthothiophene, polydiacetylene, poly(paraphenylene vinylene), polyacene, polythiazyl, poly(ethylene vinylene), polyparaphenylene, poly(phenylene vinylene), poly(thienylene vinylene) and polyphenylenesulfide.

5. The process of claim 3, wherein the organic film is a selected from the group consisting of polythiophene, polybithiophene, polyisothiophene, poly(3,4-ethylenedioxythiophene), polyisonaphthothiophene, polydodecylthiophene, poly(3,4-ethylenedioxythiophene) (PEDOT) or poly(3,4-ethylenedioxythiophene) polystyrene sulfonate (PEDOT-PSS).

6. The process of claim 1, wherein the conductive film is selected from the group consisting of a metal and a conductive non-metal.

7. The process of claim 1, wherein coating the primer layer further comprises:
    depositing a wet coating composition onto the substrate, the wet coating composition made from ingredients comprising:
        a waxy starch; and
        a liquid carrier; and
    drying the wet coating composition to form the primer layer.

8. The process of claim 7, wherein the wet coating composition is applied by a coating technique selected from the group consisting of spray coating, roll coating dip coating, spin coating, flow coating, stamp printing, die extrusion coatings, flexo and gravure coating and/or blade coating techniques.

9. The process of claim 7, wherein the waxy starch comprises at least one starch selected from the group consisting of a waxy maize starch, a waxy rice starch, a waxy cassava starch, a waxy potato starch, a waxy wheat starch and a waxy barley starch.

10. The process of claim 7, wherein the wet coating composition ingredients further comprise at least one hygroscopic material.

11. The process claim 10, wherein the at least one hygroscopic material is selected from the group consisting of glycerol, sorbitol, glycols and mixtures thereof.

12. The process of claim 10, wherein the wet coating composition ingredients further comprise at least one surfactant.

13. The process of claim 12, wherein the at least one surfactant is selected from the group consisting of an anionic surfactant, a cationic surfactant, a non-ionic surfactant and mixtures thereof.

14. The process of claim 7, wherein the wet coating composition ingredients further comprise at least one surfactant.

15. The process of claim 7, wherein the wet coating composition ingredients further comprises at least one polymer selected from the group consisting of a polyvinyl alcohol, a copolymer of vinyl alcohol and alkene monomers, a poly(acrylic acid)-poly(vinyl alcohol) copolymer, a polyvinyl alcohol-acrylic acid-methyl methacrylate copolymer and a poly(vinyl alcohol-co-aspartic acid) copolymer.

16. The process of claim 7, wherein the liquid carrier is a water based carrier.

17. The process of claim 1, wherein the etchant converts portions of the conductive film to a material that is less electrically conductive than the conductive film.

18. The process of claim 1, wherein the etchant comprises at least one oxidizing agent.

19. The process of claim 18, wherein the at least one oxidizing agent is selected from the group consisting of an aqueous sodium hypochlorite solution and a hydrogen peroxide solution.

20. The process of claim 1, wherein the etchant removes portions of the conductive film to form a conductive pattern.

* * * * *